United States Patent
Hoganson et al.

(10) Patent No.: US 7,950,879 B2
(45) Date of Patent: May 31, 2011

(54) VARIABLE SPEED DRIVE FOR PNEUMATIC TRANSPORT SYSTEM

(75) Inventors: Kenneth Michael Hoganson, Aurora, CO (US); Daniel R. Gross, Highlands Ranch, CO (US)

(73) Assignee: Translogic Corporation, Denver, CO (US)

( * ) Notice: Subject to any disclaimer, the term of this patent is extended or adjusted under 35 U.S.C. 154(b) by 283 days.

(21) Appl. No.: 12/138,686

(22) Filed: Jun. 13, 2008

(65) Prior Publication Data

US 2009/0311054 A1     Dec. 17, 2009

(51) Int. Cl.
*B65G 53/66*     (2006.01)
(52) U.S. Cl. ............................................. 406/12; 406/10
(58) Field of Classification Search ............... 406/10–33, 406/184–190, 110, 111, 112; 700/213–244
See application file for complete search history.

(56) References Cited

U.S. PATENT DOCUMENTS

| | | | | |
|---|---|---|---|---|
| 3,101,183 | A | * | 8/1963 | Hunter ............................. 406/83 |
| 3,627,231 | A | * | 12/1971 | Kalthoff ............................. 406/3 |
| 4,058,274 | A | * | 11/1977 | Hochradel et al. ................ 406/2 |
| 5,192,170 | A | * | 3/1993 | Lang .............................. 406/147 |
| 5,725,124 | A | * | 3/1998 | Bustos et al. .................. 221/211 |
| 5,864,485 | A | | 1/1999 | Hawthorne et al. |
| 7,243,002 | B1 | | 7/2007 | Hoganson et al. |
| 7,306,407 | B1 | * | 12/2007 | Gromley et al. .............. 406/197 |
| 7,326,005 | B1 | | 2/2008 | Castro et al. |
| 7,328,084 | B1 | | 2/2008 | Hoganson et al. |
| 7,363,106 | B1 | | 4/2008 | Hoganson et al. |
| 7,424,340 | B2 | | 9/2008 | Owens |

OTHER PUBLICATIONS

Mosler/Airmatic & Electronic Systems Division, System 4000, 1977, The Mosler Safe Company, Wayne, NJ, USA.

* cited by examiner

*Primary Examiner* — Gene Crawford
*Assistant Examiner* — William R Harp
(74) *Attorney, Agent, or Firm* — Marsh Fischmann & Breyfogle LLP

(57) ABSTRACT

Provided herein are systems and methods for use in controlling a translocation process of a pneumatic tube system in order to reduce the amount of energy transferred from the tube system to a pneumatic carrier and, hence, its contents. Generally, these utilities entail identifying and/or reducing forces applied to a pneumatic carrier traveling through a travel path within a pneumatic tube system. The systems and method disposed herein allow for varying the velocity of a pneumatic carrier as it passes through a travel path of the pneumatic system. Such varying of the velocity allows for reducing the total forces applied to the pneumatic carrier during passage through the system. In one arrangement, the power output of a power source connected to a compressor device is altered to vary the velocity of pneumatic carries in the system.

15 Claims, 13 Drawing Sheets

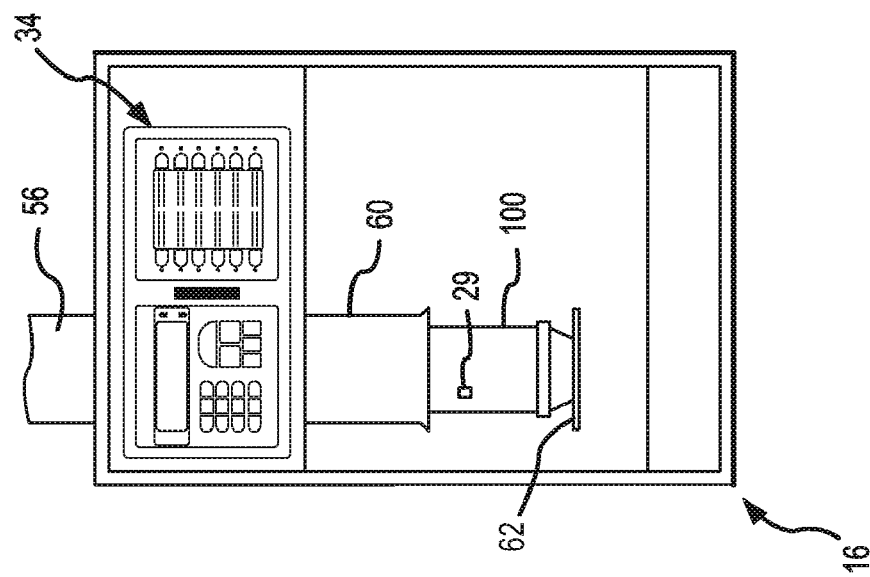
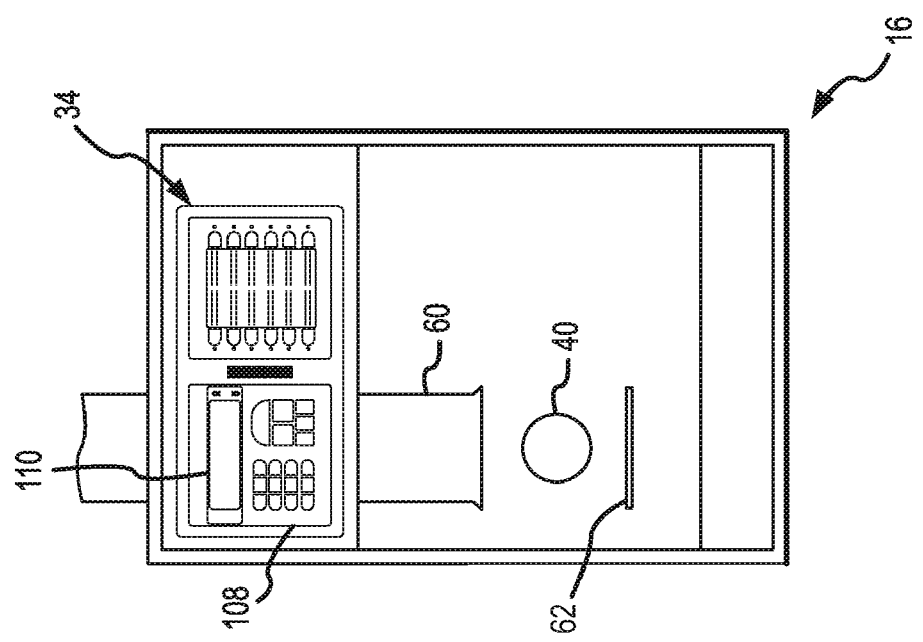

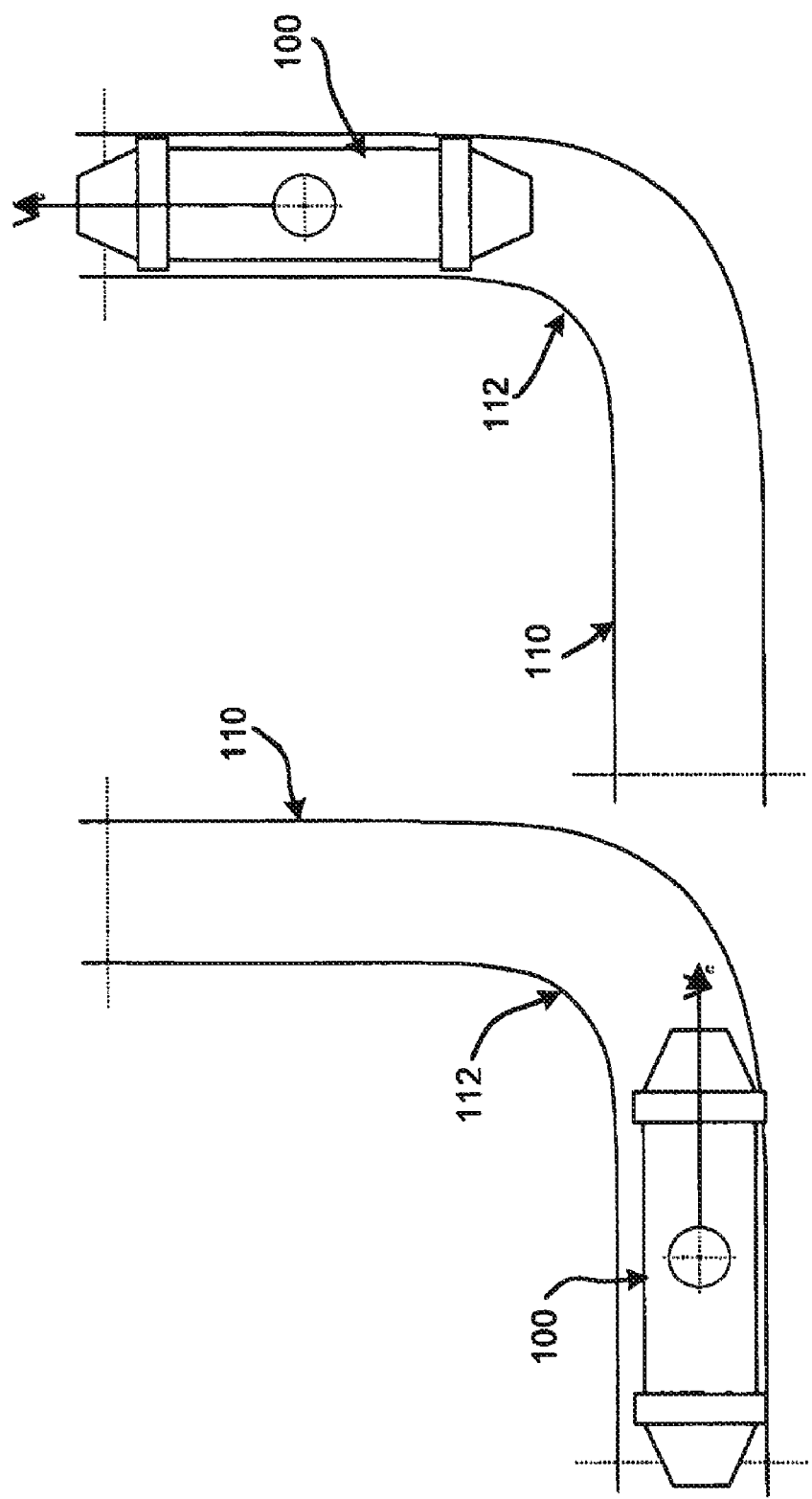

//VARIABLE SPEED DRIVE FOR PNEUMATIC TRANSPORT SYSTEM

FIELD OF THE INVENTION

The present invention relates generally to the field of pneumatic tube carrier systems. More particularly, the present invention is directed to a system and method for controllably varying the acceleration, deceleration and speed of a carrier within a pneumatic carrier system to reduce the transportation forces applied to a payload of the carrier.

BACKGROUND OF THE INVENTION

Pneumatic tube carrier systems are a well-known means for the automated transport of materials between, for example, an origination location to any one of a plurality of destination locations. A typical system includes a number of pneumatic tubes interconnected in a network to transport carriers between a number of user stations. Various blowers and transfer units provide the force and path control means, respectively, for moving the carriers through and from tube-to-tube within the system. One type of transfer unit allows pneumatic carries to be moved from a first pneumatic tube to a second pneumatic tube in order to route the pneumatic carrier between locations, or stations, in the network.

The pneumatic tubes that connect the various locations may be arranged in any manner that allows the carriers to be transferred between various stations. Generally, an individual station is interconnected to the network by a single pneumatic tube. In this arrangement, such a single pneumatic tube is utilized to carry carriers to and from the station. Other portions of the network are often interconnected with dedicated pneumatic tubes. It will be appreciated that the distances between stations in the network may be quite large. For instance, many pneumatic tube systems are incorporated into large facilities where the distance between the most distally located pair of stations may exceed several hundred yards or even several miles.

Within the healthcare industry, pneumatic tube systems are often used to move patient samples and drugs from a centralized dispensing or collection point to the point of analysis or use. For example, a blood sample may be drawn at a patient's bed side or at a central collection point (such as a satellite phlebotomy lab) and sent to a central lab for analysis and reporting. Similarly, a central pharmacy may receive a doctor's orders and dispense medications for distribution to a plurality of stations via pneumatic tube and then to the patients themselves via nurses positioned near the stations.

During transport, the samples and drugs are subjected to a number of physical forces. These physical forces may be systematic or random and are inherent in any transport process involving translocation from one position to the next. Examples include acceleration from a resting state at the dispatching station to a nominal average speed within the tube system followed by a deceleration at a receiving station from the average speed to a resting state and/or impact. These physical forces transfer energy to the payload (e.g., samples drugs, etc) of the pneumatic carrier.

SUMMARY OF THE INVENTION

The present inventors have recognized that the integrity, properties, and characteristics of samples and drugs can be altered by the physical forces imparted to them by the translocation process. For example, a separated drug comprised of immiscible fluids can be mixed by agitation from the physical forces of translocation. Another common example is the separation of blood components by centrifuging, a common process of imparting an invariant force by subjecting a blood sample to centripetal acceleration.

Stated otherwise, it has been recognized that all translocation processes have characteristic vibrations, accelerations and decelerations at the beginning of the transportation cycle, at the end of the transportation cycle, and during the transportation cycle itself. In principle, the amount of energy transferred from the transportation process to or through the payload/samples should be distinct, definable, and calculable from closed form equations of motion. That is, the energy transferred to the payload is in theory a simple function of the acceleration and deceleration parts of the translocation process, and the amplitude and frequency of the steady state portion of the process itself.

In principle, this simplifying assumption is valid. However, practical translocation processes have personality, or a uniqueness, that can only be described stochastically. For example, a translocation process that uses a person as the prime mover would have a range of power spectral densities imparted upon a translocated payload that would be both characteristic of human transport and characteristic of the specific person performing the transport. Examples include the speed with which the person walked, the human's gait, the rate at which they swung their arms and other similar sources of variance that exist between different people.

In addition to process and personality dependence, translocation processes also have a characteristic dependence on path or route. Returning to the example of a human-powered transport, the translocation process would impart energy to the characteristic of the process itself (human), the personality of the transport (the specific human performing transport), and route or path taken by the process and personality performing it. That is, if multiple paths exist for translocating a payload from one destination to another then the opportunity exists for there to be different amounts of energy imparted to the payload.

The path taken by the prime mover has characteristics affecting the energy absorbed by the payload, particularly if the path is not linear or has a character that features numerous changes in direction. In short, the path itself can have feature content affecting the amount of energy absorbed by the sample. A longer path requires a carrier to remain within the translocation process longer, imparting more energy to the sample for a given process with a particular personality. Two paths of comparable length would impart different amounts of energy to a sample if one path were smoother than the other.

Accordingly, provided herein are systems and methods (utilities) for use in controlling a translocation process of a pneumatic tube system in order to reduce the amount of energy transferred from the tube system to a pneumatic carrier and, hence, its contents. Generally, these utilities entail identifying and/or reducing forces applied to a pneumatic carrier traveling through a travel path within a pneumatic tube system. Such a travel path may include multiple distinct segments, which may be interconnected by, for example, transfer units, user stations, etc. In any case, the utilities allow for identifying and/or reducing forces imparted by different segments/components included within a travel path of a pneumatic carrier in order to minimize the impact on the contents thereof. Generally, the utilities disclosed herein allow for varying the velocity of a pneumatic carrier as it passes through a travel path of the pneumatic system. Such varying of the velocity allows for reducing the total forces applied to the pneumatic carrier during passage through the system.

According to a first aspect, a utility for use in the computerized control of a pneumatic carrier system is provided. The utility includes receiving a sensitive content input indicating that a pneumatic carrier to be transported through the system includes sensitive contents. Accordingly, a travel path may be identified for the pneumatic carrier through the pneumatic carrier system. That is, a travel path between an origination location and a destination location may be determined. Once such a path is determined, electronically stored path characteristic information may be obtained for the travel path. Based on this path characteristic information, the power output of a power source connected to a pneumatic device (e.g., fan, blower, compressor, etc.) that provides airflow to the pneumatic carrier system may be variably controlled. In this regard, variably controlling the power output of the power source variably controls the velocity of the airflow within the carrier system and hence the velocity of the pneumatic carrier as it moves through the travel path. Accordingly, variably controlling the power output may allow for selectively reducing forces applied to the pneumatic carrier as it passes through the travel path.

In one arrangement, variably controlling the power output may reduce the velocity of the pneumatic carrier during acceleration and/or deceleration at the beginning and the end of the travel path and/or individual segments of the travel path. Further, variably controlling the power output may allow for reducing the overall travel velocity of the pneumatic carrier through the pneumatic tube system. This may allow for reducing, for example, vibration applied to the carrier and its contents by the pneumatic tubes through which is the carrier passes.

In one arrangement, the travel path may include at least first and second segments that may be interconnected by, for instance, transfer units, user stations, etc. In addition, the travel path may include a single pneumatic tube having various different segments that may require different handling characteristics. For instance, a transfer tube having a large straight run may allow for transporting the pneumatic carrier at a high speed without imparting significant energy thereto. However, if a latter portion of the pneumatic tube includes a bend or curve, it may be desirable to reduce the speed of the pneumatic carrier prior to the carrier passing around the bend/curve to reduce centripetal forces applied to the carrier. In this regard, it will be appreciated that a travel path may include a plurality of segments and each segment may have individual path characteristic information. Carrier location may be obtained (e.g., using a communications device) as the carrier passes through a segment to determine when the carrier will enter a segment having different characteristics. In any case, the power output of the power source may be variably controlled separately for different segments of the travel path. Further, such separate power outputs may each be variable. For instance, a first power output for a first path segment may include a variable profile and a second power output for a second path segment may have steady state power output.

The path characteristic information may be any information that is associated with forces that may be expected to be applied to a pneumatic carrier while passing through the travel path. In one arrangement, each segment of a pneumatic tube system may include path characteristic information. Such information may include roughness and/or curvature of the individual segment of the path. Furthermore, such information may be measured at varying speeds such that forces expected to be applied to a pneumatic carrier may be expressed as a function of a velocity/speed of a carrier passing therethrough. Accordingly, by identifying a travel path through the system, individual characteristic information for the individual segments that form the path may be aggregated to identify a total aggregate force that may be expected to be applied to a carrier. Accordingly, the power output of the power source for one or more of the segments of the travel path may be adjusted to reduce the aggregate force applied to the carrier to an acceptable level (e.g., below a predetermined threshold). However, while it may be desirable to reduce the applied forces beneath a predetermined threshold, it may also be desirable to minimize transit time of the pneumatic carrier through the travel path in order to enhance throughput of the overall pneumatic carrier system. Accordingly, the utility may also attempt to enhance or maximize the allowable travel velocity of a carrier (e.g., reduce or minimize travel time) without exceeding a predetermined threshold of applied forces. In addition to receiving sensitive content input indicating a pneumatic includes sensitive contents, the utility may further include receiving a specific type of sensitive content input. In this regard, specific handling protocols may be implemented for specific types of sensitive contents.

Variably controlling the power output of the power source may allow for selectively altering the airflow velocity within a desired portion of the pneumatic carrier system. In this regard, it will be appreciated that as pneumatic carrier systems may include a plurality of different power sources and pneumatic devices (e.g., blowers, etc.), the utility may be operative to control multiple different power sources that may be associated with different portions of a pneumatic carrier system in order to reduce forces applied to a carrier during its transport between an origination location and a destination location. Further, it will be appreciated that the utility may utilize additional inputs during the translocation process in order to variably control the movement of the carrier along the travel path. For instance, the utility may receive location information from one or more communications devices that communicate with the carrier as it passes through the pneumatic tube system. In this regard, an identification element associated with the carrier may be read at various locations through the system in order to identify a location of the carrier. Further, such systems may be operative to provide velocity information of the carrier. Accordingly, the system may utilize these to adaptively adjust the power output of the power source in order to increase, decrease or otherwise affect the airflow within the portion of the pneumatic tube system in which the carrier is currently located.

When specific types of contents are specified, the utility may be operative to implement predetermined acceleration and/or deceleration profiles and/or maximum travel velocities. Furthermore, the system may be operative to identify alternate paths between an origination location and destination location. In this regard, depending on the sensitivity of the contents, the utility may opt to select the shortest available path even if such a path is not currently available. That is, system throughput may be reduced in order to further reduce the forces imparted to a carrier passing through the system.

The sensitive content input may be received from a user launching a carrier into the system. In such an arrangement, a user may indicate from a user interface that the carrier includes sensitive contents. Further, the user may indicate a specific type of contents of the carrier. In an alternate arrangement, the carrier system may be operative to interrogate a carrier to identify if that carrier has sensitive contents. For instance, specialized carriers may be utilized to carry sensitive contents. In such an arrangement, the specialized carriers may include an identification element that indicates to communications devices (e.g., readers/interrogators) of the pneumatic system that the carrier includes sensitive contents and that specialized handling is desired and/or required.

According to another aspect, a utility is provided for variably controlling a power source connected to a pneumatic device that provides airflow to a pneumatic carrier system. The utility includes identifying a travel path of a pneumatic carrier through a pneumatic carrier system between an origination location and a destination location in a pneumatic carrier system. A handling profile for use in controlling airflow within the pneumatic tube system is generated for use as the carrier moves through the travel path. This handling profile is used to variably control the power output of the power source, which is connected to a pneumatic device that provides airflow to the pneumatic tube system.

In one arrangement, the handling profile may include a plurality of profiles for individual path segments of the travel path. Each profile may include variable acceleration and/or deceleration curves as well as individualized steady state acceleration levels and/or variable acceleration throughout the length of the path segment.

In one arrangement, generating the handling profiles includes accessing pre-stored information and calculating a profile for each segment. In such an arrangement, the stored information may include curves and/or functions that allow for calculating a handling profile based on one or more characteristics of a particular transaction. Such characteristics may include, without limitation, the contents of a carrier, the weight of a carrier, etc. Alternatively, pre-stored handling profiles may be accessed and implemented for each segment of the system. Such pre-stored profiles may further be selected by carrier type. For instance, an individual segment within the pneumatic tube system may have multiple handling profiles for different types of transactions. A first handling profile may be for very sensitive carrier contents in which case the lowest sensitivity handling characteristics profiles (e.g., acceleration and deceleration and average travel velocity settings) may be utilized for each segment of a travel path. Further, intermediate sensitivity, low sensitivity and non-sensitive profiles may exist for use with appropriate carrier types.

According to another aspect, a utility is provided for identifying path characteristics for individual path segments of a pneumatic tube system. The method includes launching a pneumatic carrier through an individual segment of the pneumatic tube system while measuring the forces applied to the carrier. This may be repeated for a plurality of different travel velocities. Accordingly, the plurality of different measurements for a particular path may be utilized, for example, to generate calibration curves and/or functions for use with the individual path segment. It will be further appreciated that carriers of different weights may be utilized to further provide information for the path segments. In any case, the path characteristics for each path segment may be stored to a computer readable storage medium. At a subsequent time, the stored path characteristics for one or more paths may be accessed in order to generate an overall handling profile for a given transaction.

BRIEF DESCRIPTION OF THE DRAWINGS

FIG. 3A illustrates a view of a user station including a carrier identification device.

FIG. 3B illustrates a view of the user station of FIG. 3A including a pneumatic carrier with an identification chip.

FIGS. 9A-9B illustrate a pneumatic carrier transitioning from a first plane of motion to a second plane of motion as the carrier moves through a bend in a pneumatic tube.

FIG. 11 illustrates a default velocity handling profile.

FIG. 12 illustrates a variable velocity handling profile.

DETAILED DESCRIPTION

Figure 1:
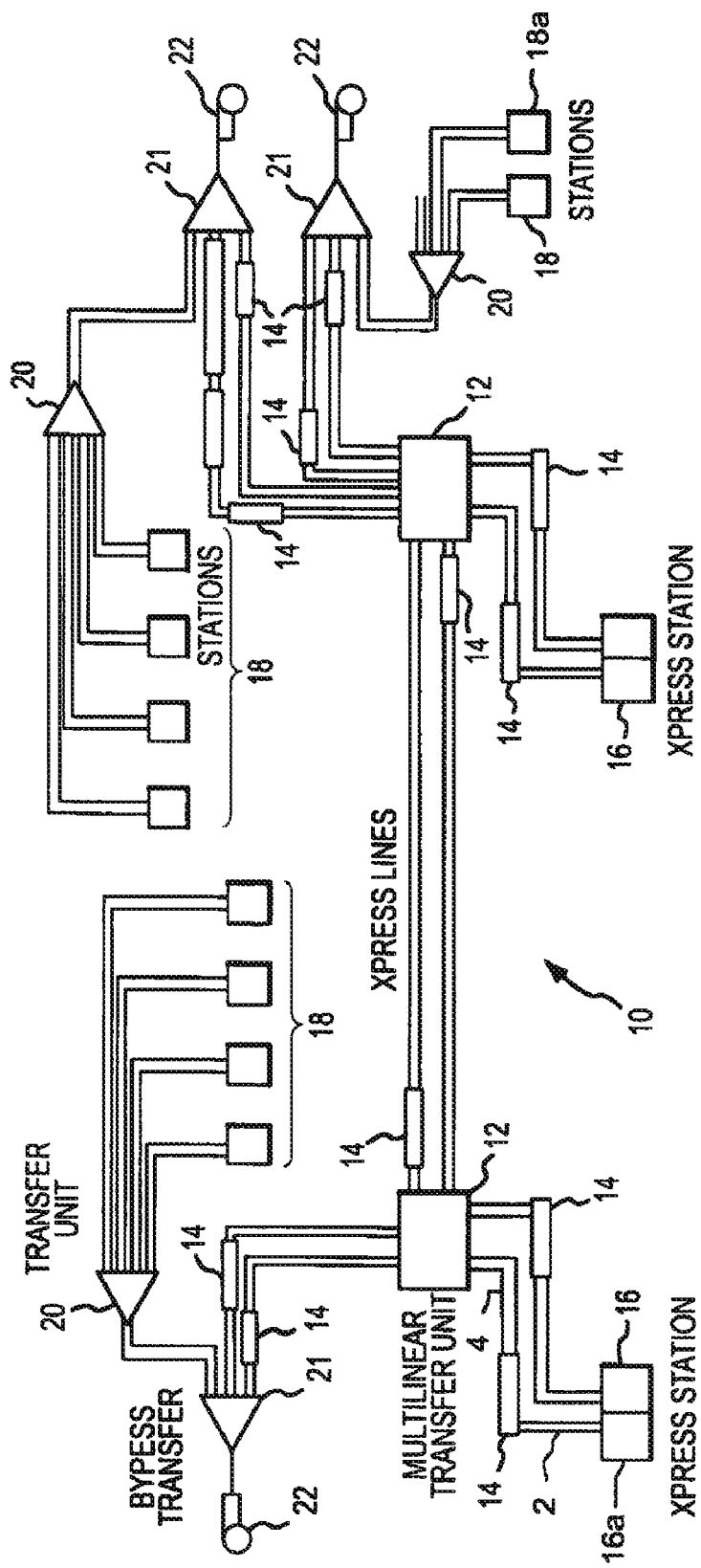
FIG. 1 illustrates a mechanical diagram for the pneumatic carrier system.

Exemplary embodiments of a pneumatic transport system that allows for reducing the transportation forces that are applied to a payload are depicted in the figures. Disclosed in FIG. 1 is a system diagram for an exemplary pneumatic carrier system 10 within which the invention described herein is employable. In general, the pneumatic carrier system 10 transports pneumatic carriers between various user stations 16, 18, each such transport operation being referred to herein as a "transaction". At each of the user stations 16, 18, a user may insert a carrier, select/enter a destination address/identification and a transaction priority, and then send the carrier. The system determines an optimum path to route the carrier and begins directing the carrier through the system.

Interconnected with each station 16, 18 of the exemplary system 10 is a transfer unit 20 which orders carriers arriving through different tubes from a different station 16, 18 into a single pneumatic tube. This pneumatic tube is further in connection with a vacuum by-pass transfer unit 21 (i.e., a turn around transfer unit) and a blower 22 that provides the driving pneumatic force for carrier movement. A set of transfer units 20, 21, a blower 22 and one or more stations 16, 18 may define a single zone. Generally, the blower 22 of each zone is operative to create pressure and/or vacuum (i.e., system pressure) within the pneumatic tube(s) of that zone. This pressure/vacuum is operative to create a pressure differential across a carrier disposed within the pneumatic tubes and causes the carrier to move through the pneumatic tubes. That is, the blower 22, transfer units and pneumatic tubes create a pneumatic circuit for use in transporting carriers between first and second points within the system 10. Multiple different zones may be interconnected (e.g., using a multi-linear transfer unit 12) to collectively define the pneumatic carrier system 10. It will be appreciated that in other system embodiments, one or more stations may utilize a pass through configuration and that zones may be formed in a loop configuration.

Within the system 10 itself, one or more devices are employable for ordering and routing carriers to their selected destinations. One type of device is a traffic control unit (TCU) 14 which is employable to receive, temporarily store and release a number of carriers. This functionality allows for launching a carrier from a user station 16, 18 prior to a path for a destination location being established. Likewise, this allows carrier tubes interconnecting the user station 16, 18 to be cleared for incoming traffic. One or more TCUs 14 may be provided within the system 10 that operate as linear storage devices, e.g., on a first in first out (FIFO) basis. However, it will be appreciated that certain aspects of the present invention are applicable to other configurations. For instance, certain aspects of the invention may be applied to a TCU that operates on a last in first out (LIFO) basis and/or a matrix style storage device, which store carriers in two-dimensional matrixes, wherein each carrier is separately storable, retrievable and releasable without movement of other carriers stored in the matrix.

Also included in the system 10 are multi-linear transfer units (MTUs) 12 which have functionality to direct carriers from one pneumatic tube to another pneumatic tube (e.g., between tubes in single zone or between different zones). For example, a MTU 12 may receive a carrier released by a TCU 14 in a first pneumatic tube and direct the carrier into a second pneumatic tube in the system 10 to complete a given transaction.

Figure 2:
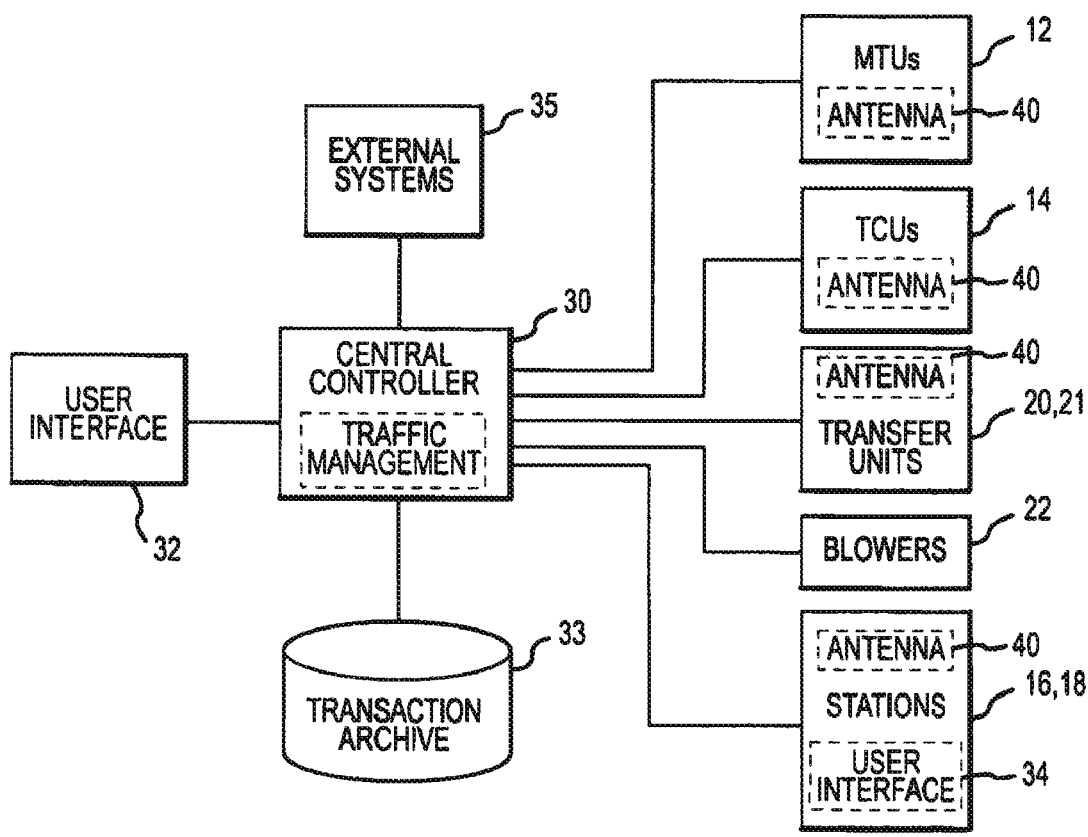
FIG. 2 illustrates a system diagram for the operation and monitoring of the pneumatic carrier system.

All of the components described in FIG. 1 are electronically connected to a system central controller (SCC) 30 that controls their operation and which is disclosed in the electrical system diagram of FIG. 2. The system central controller (SCC) 30 provides centralized control for the entire pneumatic carrier system 10 and may include a digital processor and memory/achieve 34. In addition to controlling the operation of the carrier system 10 as depicted in FIG. 1 the SCC 30 may provide additional functionality. Such functionality may include, without limitation, interconnection to external systems 36 and/or use of identification devices 40 that may allow for identification of carriers within the system 10. In the latter regard, a system for RFID identification within a pneumatic carrier system is described in U.S. Pat. No. 7,243,002, entitled, "System and Method for Carrier Identification in a Pneumatic Carrier System," having an issue date of Jul. 10, 2007, the contents of which are incorporated by reference herein. It will be appreciated that in other embodiments, different identification devices may be utilized, including, without limitation, optical devices and magnetic devices. Further the SCC 30 may be connected to or form the controller of the variable speed drive discussed below.

Connectable to the SCC 30 may be one or more user interfaces 32 through which a system user may monitor the operations of the system and/or manually enter one or more commands to control its operation. Typically, at least one user interface 32 is located at or within an area serviced by stations 16, 18. For example, in a medical facility application, one or more user stations 16, 18 and at least one user interface 32 may be provided within each emergency room, laboratory, nursing station, etc. In this regard, the user interface may be contained in the stations 16, 18, or be stand-alone units. Components 12, 14, 16, 18, 20, 21 and 22 shown in FIG. 2 are representations of the various electrical and electro-mechanical systems that may be employed by the pneumatic carrier system 10. Although in FIG. 2 they are represented single blocks, one skilled in the art will realize that the block for each type of device represents the electronics for a number of the same or similar type of components positioned throughout the system which provides for its operation.

FIGS. 3A and 3B are front views of a station 16 which is employable in the pneumatic carrier system 10 described herein. As shown, the station 16 includes a dispatcher connected to a pneumatic tube 56 that is employable for transporting and delivering carriers 100 to and from the station 16. Also included with the station 16 is a user interface 32 that includes a control panel 108 that has a number of interactive devices which a system user may employ for entering data including, for example, destination information, priority information, and security information (e.g., a personal identification number (PIN)). The control panel 108 is also employable for entering data for a carrier 100 received at a station. For example, if a carrier 100 has a security limitation associated with it, release authorization information can be entered to complete delivery of the carrier 100 at the destination location. Also included with the user interface 32 is a display 110 which is configured to present messages relating to transaction and system status which are viewable by a system user. The use of the user interface 32 will be described in greater detail below.

Also positioned relative to the dispatcher 60 are a carrier holder 62 and an antenna device/reader 40. As with the other antenna devices/readers 40 described above, this device is configured to read information, and write information if so configured, on an ID element 29 incorporated into or onto a carrier 100. Though shown as utilizing a single antenna device/reader 40, it will be appreciated that the station 16 may include two or more such devices. That is, the station 16 may include a first antenna device/reader for reading ID elements 29 on carriers that are received by the station 16 (e.g., prior to releasing the received carrier in response to an authorization code) as well as a second antenna device/reader 40 associated with the dispatcher 60. The holder 62 is configured such that a system user may place a carrier on the holder 62 and enter destination information through the control panel 108. Once all the appropriate information has been entered, the dispatcher 60 will move the carrier 100 into a pneumatic tube 56 for transport to a selected destination.

Figure 4:
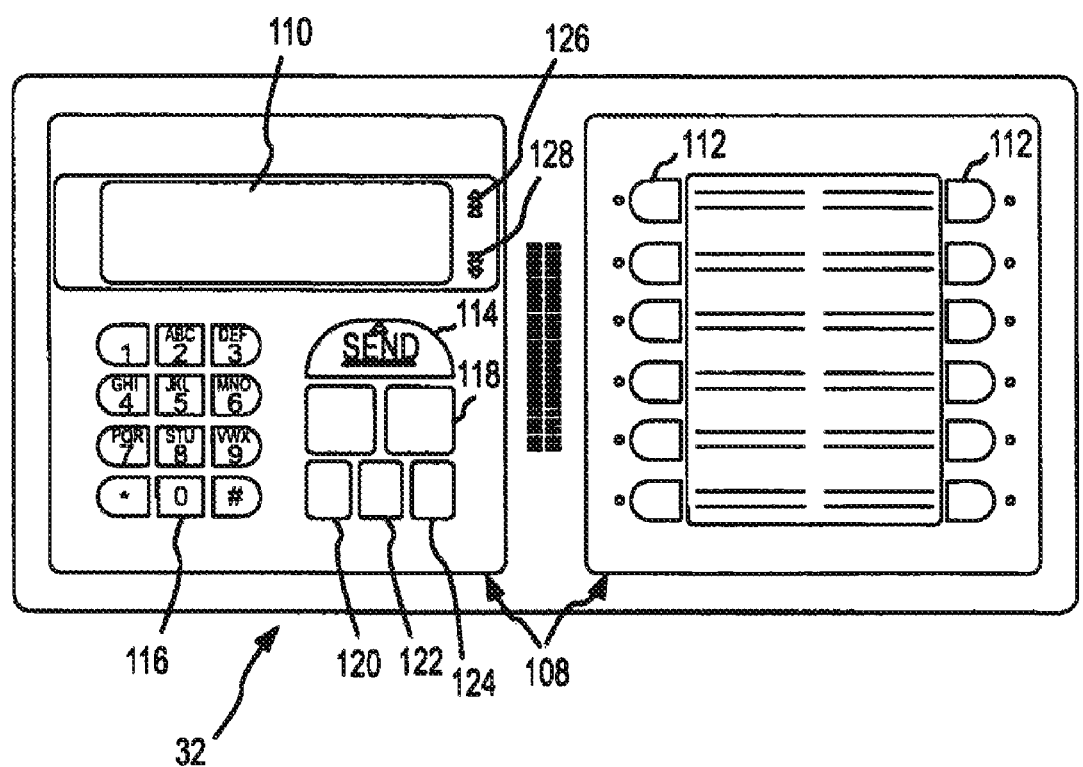
FIG. 4 illustrates a user interface for use with a user station.

FIG. 4 illustrates the user interface 32, which may be utilized to perform various functions within the system 10. In particular, FIGS. 3A, 3B and 4 show one embodiment of a user interface 32 that may be incorporated into sending/receiving stations 16. As shown, the user interface 32 includes the control panel 108 and a display 110. The control panel 108 includes a number of "speed-dial" buttons 112 that may be programmed to allow a user to insert a carrier 100 into the dispatcher 60, select a preprogrammed destination station by depressing a corresponding speed-dial button 112, and dispatch the carrier 100 by depressing the send/enter button 114.

In addition, the control panel 108 includes a numeric keypad 116 for use in manually entering, for example, destination station information. The control panel 108 also includes a number of general action buttons including, for example, an empty return/send button 118 that allows for returning an empty carrier 100 to the system 10 for distribution to stations 16 that may be deficient of carriers 100. Further, the control panel 108 may also include track carrier 120 and call carrier 122 functions, respectively, that allow monitoring the progress of a dispatched carrier. Finally, the control panel 108 includes a menu button 124 that allows for accessing further system functions via the display 110. In the present invention, the user interface also includes a sensitive payload button 128. This sensitive payload button 128 allows a user to indicate that the contents of a carrier to dispatch may benefit from specialized handling by the pneumatic system, as will be further discussed herein.

Figure 5:
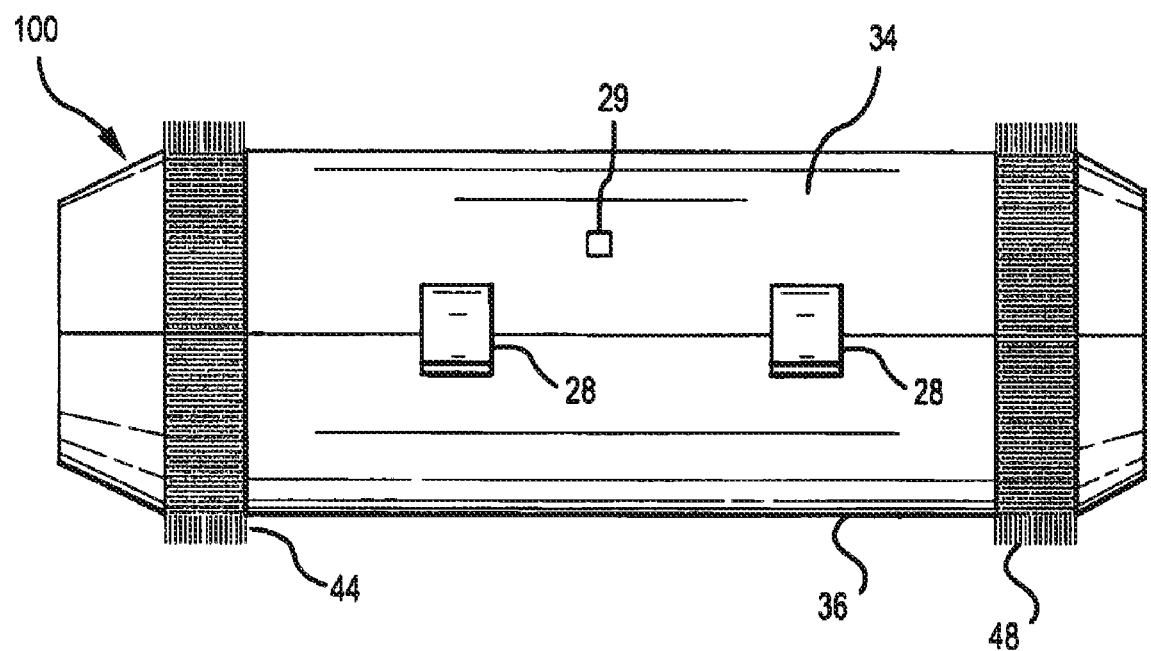
FIG. 5 illustrates one embodiment of a pneumatic carrier including an identification chip.

One type of carrier 100 that may be utilized with the system 10 is illustrated in FIG. 5. As shown, the carrier 100 includes first and second shell members 34 and 36 that collectively define an enclosed space for use in carrying materials (e.g., a payload) as they are transported through the system 10. These shell members 34, 36 are adjoinably cylindrical in cross-section for use in correspondingly cylindrical pneumatic tubes of the system 10. The shell members 34 and 36 may be pivotably interconnected by a hinge member (not shown), and latches 28 may be provided for securing the first shell member to the second shell member in a closed configuration. Also included as part of the carrier 100 are wear bands 44, 45. The wear bands 44, 48 are sized to snuggly fit within the inside surface of the pneumatic tubes in order to substantially block the passage of air across a carrier 100 within such a pneumatic tube. Accordingly, this blockage results in a pressure differential across the carrier 50 that results in the carrier 50 being pushed or drawn through the pneumatic tube.

In the embodiment shown, an ID element 29 is attached to one of the shell members 34. Though shown as a single ID element 29, it will be appreciated the additional ID elements may be utilized. In any case, the ID element 29 is configured to store identification information written thereon, which may be obtained from the element when the carrier 100 is proximate to an ID device. In this regard, ID devices such as antennas/optical readers, etc. may be incorporated into pneumatic tubes within the system 10 as well as the system components such as 12, 14, 16, 18, 20, 21 and 22. This may allow for monitoring the location of a carrier as it passes through the system as set forth in U.S. Pat. No. 7,243,002, as incorporated above.

Translocation Process

Figure 6:
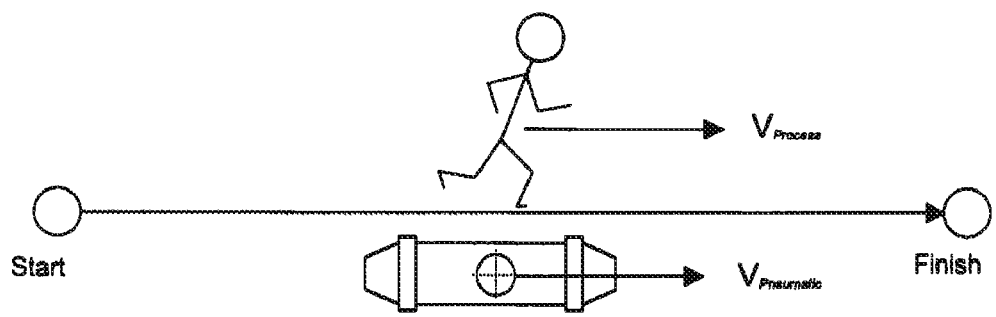
FIG. 6 illustrates a first translocation process whereby a carrier undergoes physical forces while moving from one location to another.

All translocation processes for moving objects impact acceleration and deceleration forces on the object at the starting and ending locations of the particular translocation process. While the same forces are applied by different translocation processes, they differ primarily in their magnitude. For instance, movement by pneumatic transport typically involves starting and ending forces and acceleration that are different than movement by human locomotion, automated guided vehicle, or other translocation methods. Between the starting and ending locations, a payload (e.g., samples or drugs) is subjected to physical forces characteristic of the translocation process. For example, if a sample or drug were transported by a human carrying it at the end of their arm, the sample would be subjected to repetitive accelerations and decelerations characteristic of the harmonic motions of human locomotion. See, e.g., FIG. 6. These harmonic motions are systematic and characteristic of the transportation process and are independent of the starting and ending accelerations and forces. In the case of a pneumatic tube transport system, the interactions between the carrier and the transport tubes, transfer units, stations etc. impart forces on the carrier and its contents. That is, each different translocation process has an individual personality or uniqueness. If two separate and distinct samples are moved along the same path by different means (one by human power, the other my pneumatic tube), the amount of energy absorbed by each sample will be different and characteristic of the translocation process.

Figure 7:
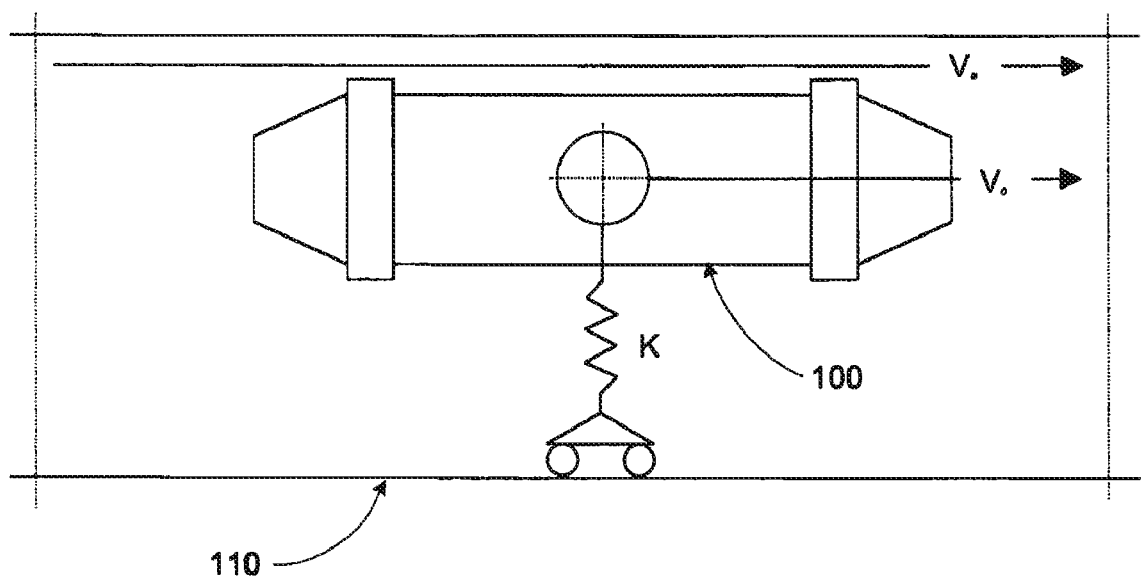
FIG. 7 illustrates a second translocation process whereby a carrier moves through mathematically represented pneumatic tube system.
Figure 8B:
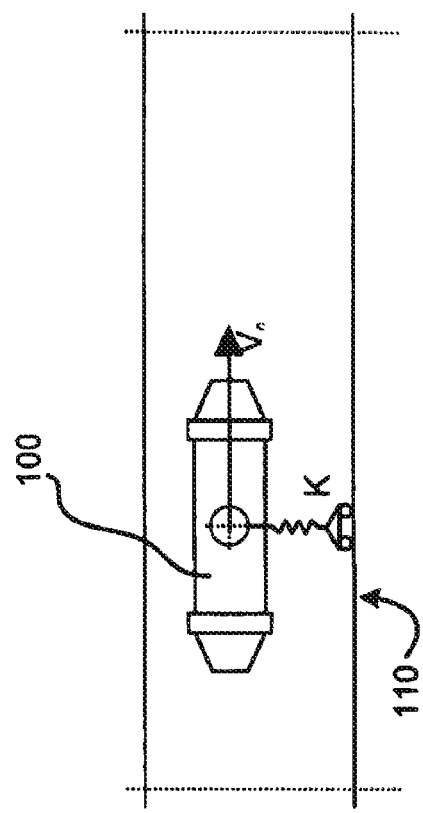
FIG. 8B illustrates a pneumatic carrier moving through a relatively smooth portion of a pneumatic tube transport system.
Figure 8A:
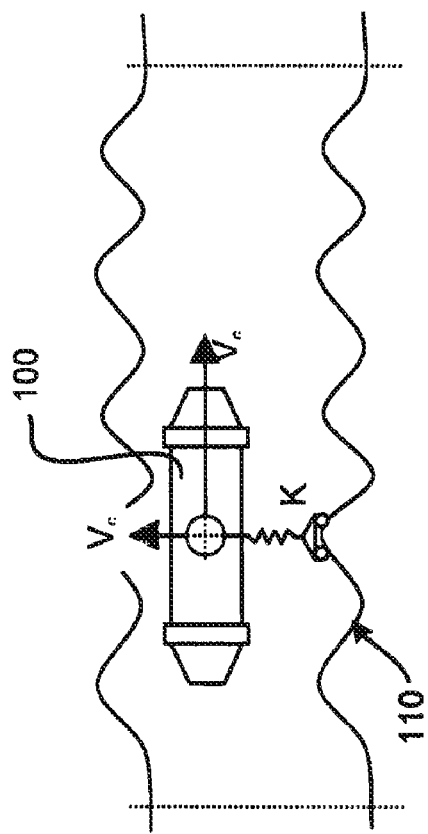
FIG. 8A illustrates a pneumatic carrier moving through a relatively rough portion of a pneumatic tube transport system.
Figure 10A:
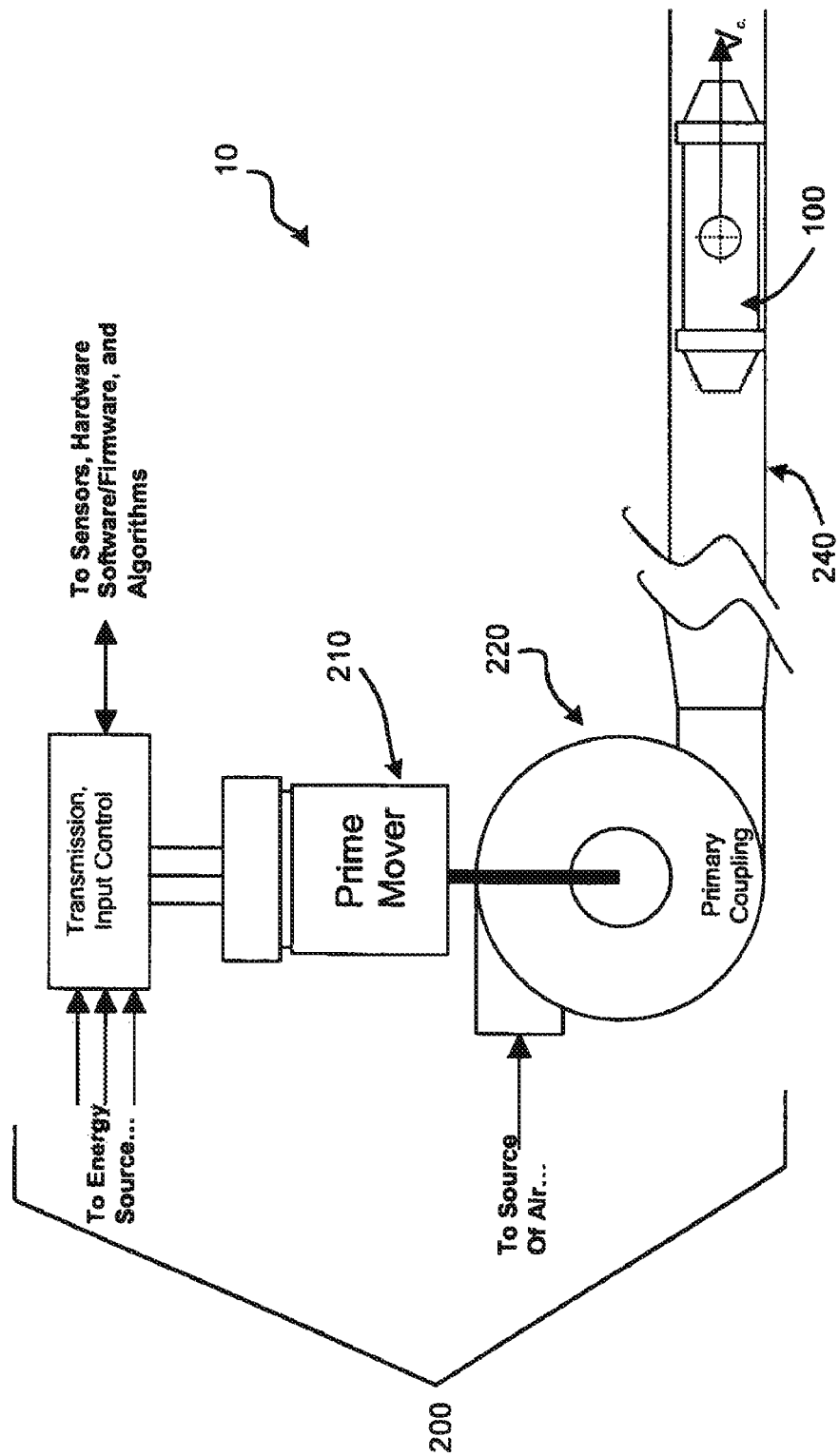
FIG. 10A illustrates components of a pneumatic tube system including a variable speed air transmission system.
Figure 10B:
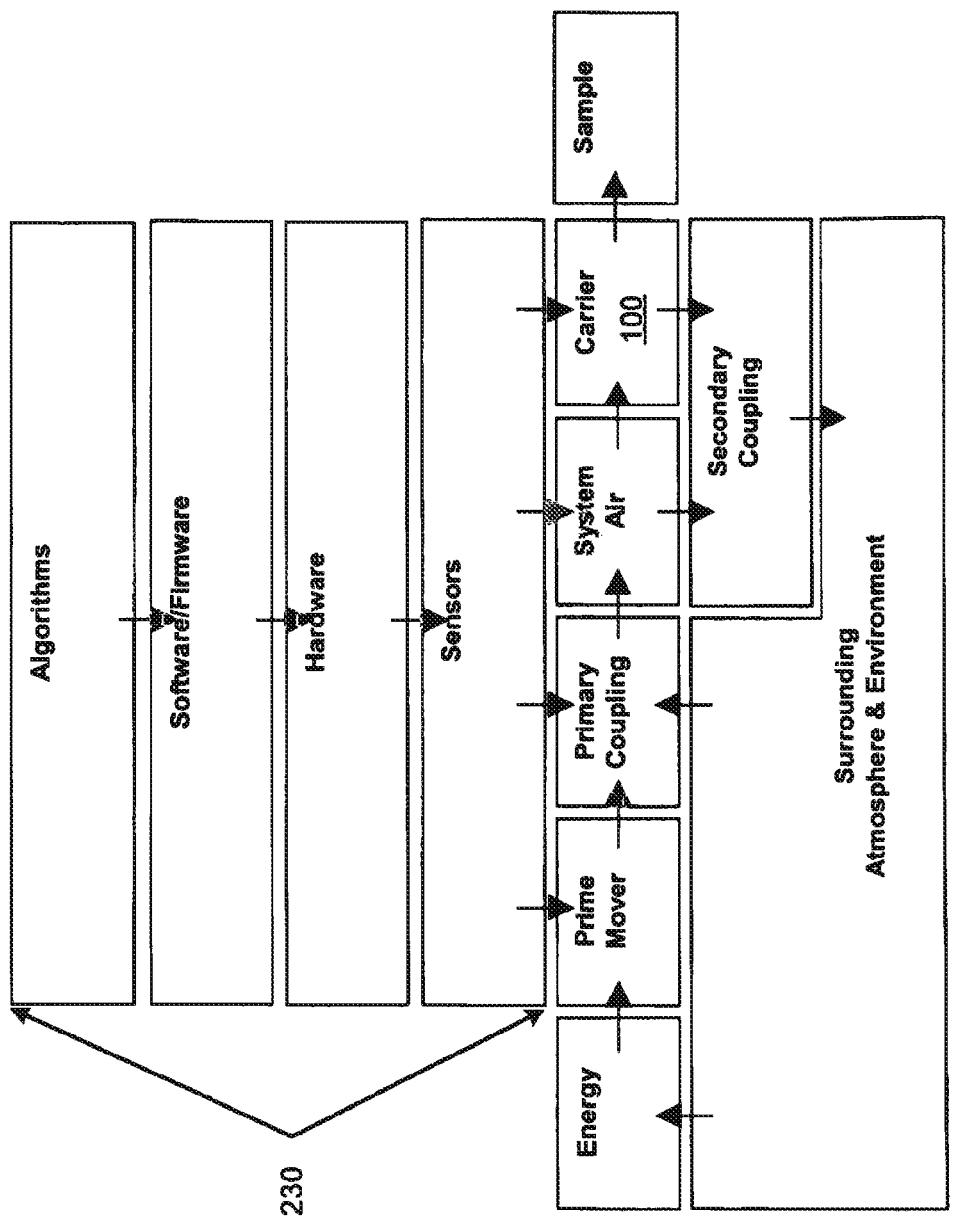
FIG. 10B illustrates a system diagram of a pneumatic tube transport system of FIG. 10A.

In the case of a pneumatic tube system, the interactions between the tube system and the sample can be aggregated into a forcing function affecting each carrier that follows each path within each transport. Such a function integrates the effects of process, personality, and path, and can be used to describe the total mechanical energy absorbed by the carrier during the translocation process. For instance, FIG. 7 illustrates an idealized suspension of a carrier 100 under transport in a pneumatic tube 110. As shown, the vertical path of the carrier 100 is affected by the carrier velocity and the relative position of the restraining walls to the centerline of travel of the carrier. Measurement of such information may be utilized to determine the force applied to the carrier as it passes through a portion of the pneumatic system. In this regard, it is noted for translocation processes that have comparable path lengths and travel velocities, the path that is smoother will impart less energy to the sample than the path that is "rougher". See FIGS. 8A and 8B.

In general, translocation processes that take the shortest paths will impart less energy to the carrier and payload. For any translocation process that moves a carrier or payload at a particular velocity along paths of comparable smoothness, the shortest and most direct path will both require the least amount of energy to move the carrier or payload, and will also impart the least amount of energy to the carrier because (a) the path has fewer total stochastic perturbations, (b) the carrier is transported in less time preventing absorption of more mechanical energy, and (c) the path is more linear with fewer systematic perturbations.

Further, the curvature and elevation changes in the pneumatic transport system that are typically necessary to incorporate such a system into a facility may also change the interaction between the carrier and the pneumatic tube system. Carriers accelerate and decelerate frequently as they travel in a pneumatic tube system. For example, carriers 100 that transition from a first plane to a second plane (e.g., around a curve 112 of a tube 122) decelerate and are subjected to centripetal accelerations necessary to affect the direction change. See FIGS. 9A and 9B.

In summary, during passage through the pneumatic system 10, the carrier 100 is subjected to a number of physical forces. For instance, when the carrier is launched into the system (e.g., from a dispatch station), the carrier is accelerated from a resting position to a travel velocity. Likewise, the carrier is decelerated from a travel velocity to a resting position upon arrival at a destination station. See FIG. 6. In between, the carrier may experience numerous acceleration/decelerations as the movement of the carrier is stopped and restarted as it is transferred between zones, etc. Further, due to the curvature of the transport tubes as they are routed throughout a facility, the carrier will typically experience centripetal forces as it travels through the system. Stated otherwise, the carrier is subjected to physical forces inherent to its translocation process. In addition to being applied to the carrier, these forces are also applied to the payload/contents of the carrier.

The integrity, properties, and characteristics of samples and drugs can be altered by the physical forces imparted to them by the translocation process. For example, a separated drug comprised of immiscible fluids can be mixed by agitation from the physical forces of translocation. Another example is the separation of blood components by centrifuging, a common process of imparting an invariant force by subjecting a sample to centripetal acceleration.

The Transport Cycle

At the start of a transport cycle, a carrier is at rest in one of a plurality of stations or terminals. The central computer is advised of the presence of the carrier and its need to use the system. This may be through a keyboard entry by a user or operator, or it may be through automated interrogation of the carrier itself. In any case, the system is made aware of the carrier's presence as well as its destination. Once the path to the destination is considered viable, an air flow is made available to the tube/line containing the carrier by moving valves or other switching mechanisms. Air flows across the carrier, creating a drag force that accelerates the carrier to a speed slightly below the free stream velocity of the air flow whereupon an aerodynamic force balance is created.

In a theoretical system with no direction changes, the carrier moves at this speed until it reaches its destination. At its destination, the air flow, which is also sometimes referred to as free stream air, is vented and the end of the tube is capped, creating a closed column of air. The carrier hits the column of air, creating a region of high pressure in the column. The pressure differential along the carrier body creates a deceleration force that slows the carrier to a stop. In conventional technologies, a carrier approaching its terminal (e.g., transfer unit, user station, etc.) is subjected to a reversing force generated by an air column created ahead of the carrier by a vent. In the industry, this vent is known as a pressure relief valve, and can be created by an air diode.

Practical pneumatic tube systems involve numerous direction and velocity changes. Each direction change introduces forces and energy into the carrier/payload system. These direction changes occur as the carrier moves through pieces of equipment known as transfer units for traffic management purposes. Path direction also changes as the carrier moves though bends and curves essential and necessary for a practical path construction between two terminals in a physical building. Each movement through a bend or curve introduces centripetal forces and compensatory drag forces with each direction change. Similarly, a carrier may be slowed or stopped along its path to negotiate, for example, an elevation change. Under these conditions, the carrier is moving vertically and it slows (or accelerates) as the gravitational force is either slowing or speeding progress along the line of travel. Finally, a carrier may be mechanically slowed or stopped for traffic management purposes, effectively forming a static or moving queue that is awaiting transfer to another piece of equipment.

In all cases, the change in direction and forward motion at the beginning, ending, and within the transport cycle introduces mechanical energy into the carrier and its contents. Minimizing the mechanical energy sources and their transfer to the carrier contents is a goal of the present invention. Reducing the carrier's terminal speed is one method for reducing the energy transfer to a carrier, particularly for energy sensitive payloads. However, this approach is not without its problems. While reducing carrier speed effectively reduces the mechanical energy transmitted to the carrier and contents, it also decreases system throughput. The reduction in average speed, while it improving the opportunity for maintaining content integrity, also implies a reduction in the number of units per hour that can be transported. Pneumatic tube systems are useful to their owners based on their capacity, and reducing carrier speed effectively reduces capacity. With conventional technologies, additional equipment is needed to replace the lost capacity.

Pneumatic tube systems transport a variety of containers and contents in addition to energy sensitive contents/payloads such as drugs and samples. These include paper, hospital supplies, and even empty carriers redistributed from their destination to other locations for reuse. These payloads are insensitive to the energy absorbed during translocation. Transporting them at lower speeds optimized for transport-sensitive materials unnecessary wastes system capacity. Further, some transports with insensitive payloads can be accomplished at higher speeds, effectively adding capacity to the system. Alternatively, even a carrier with a sensitive payload traveling on a long, straight run where there are few changes in direction may be moved at higher speeds without significantly increasing the total energy absorbed by the sample during transport if the acceleration of the carrier to such higher speeds is gradual. This effectively increases throughput, at little or no additional risk to the carrier contents.

A Pneumatic Tube System With Variable Speed Drive

The present system utilizes an "air transmission" that allows for selectively delivering the air power for each transaction necessary to minimize the probability of damage to the payload while optimizing throughput. In this regard, insensitive contents may be moved at higher speeds without consideration of terminal and in-transit accelerations and decelerations, while sensitive contents may be moved at slower average in-transit speeds and have tailored acceleration and deceleration profiles designed to minimize the energy absorbed during transport by the carrier and its contents. In effect, the system delivers tailored air horsepower to each individual transaction based on its particular contents. Further, the power delivered to each individual transaction may be variable based on its path and its personality to assure the content of each transaction is handled in a fashion least likely to affect its integrity.

FIGS. 10A and 10B illustrate components of a pneumatic tube system 10 incorporating a variable air transmission system 200. The components of the present embodiment include a prime mover/power source 210, a fan, pump or compressor 220 for converting the mechanical energy of the power source 210 into air power/horsepower. The system 200 also includes a controller 230 for adjusting the power transferred from the power source 210 to the fan 220 that generates the airflow that moves the carrier 100. The controller 230 is a computer control that receives inputs from various sensors in order to evaluate the physical information about the system (air flow, carrier speed, or other Newtonian properties) into analog or digital inputs for use by the computer control 230. The controller may incorporate software/firmware and various hardware to evaluate the inputs and convert them into physical actions. In this regard, the controller may utilize algorithms or methods specific to a particular installation that are converted to programs for operating the system.

Methods for Altering Air Speed and Air Horsepower

State of the art pneumatic tube systems impart forces to the carrier 100 and their contents by digitally controlling airflow to a particular tube or path 240 with mechanically actuated valves (not shown). In this method, the prime mover 210 is always on, with air flowing constantly. All practical methods for altering free stream velocity at the flows and pressures relevant to a pneumatic tube system reduce the air horsepower available to the carrier. Under most conditions, the most measurable physical change in the free stream is a reduction in air speed. By reducing the airspeed for a given pressure in a tube, there is less drag force on the carrier, effectively limiting its top and average speeds. Lowering these speeds lowers the energy absorbed by the carrier during acceleration or deceleration either at the destination or at intermediate points in the system.

The amount of air entering the piping network can be changed either (a) by restricting airflow, (b) by venting the air at the source, or, as set forth in the present inventive system, (c) by changing the power transmitted to the airstream by reducing the effective output of the electric motors or other prime mover attached to the pump, fan or compressor used to accelerate and pressurize the airstream.

Restricting airflow may be accomplished by inserting an orifice, damper valve, or other obstruction into the airstream on the system side of the fan, pump, or compressor. Such devices effectively alter the fan, pump or compressor's operating point, and maybe fixed or variable. In effect, the prime mover and its attached fan, pump, or compressor run at a fixed power input, and additional "load" is introduced in the form of a restriction to slow the carrier. The added energy is released into the environment in the form of heat. However, this approach is difficult to control, expensive, and is unstable because of the changing pressure of the air column as the carrier moves through a pneumatic tube. Venting air at the source effectively allows a constant horsepower input, but diverts some of the air into the surrounding atmosphere. Variable dampers or restrictions maybe used to adjust the airflow that is diverted. Again, such an approach is difficult to control, expensive, and is often unstable.

Actuators and controls can be added to the orifices and dampers to provide automated control of the air horsepower available to the carrier. However, these can be difficult to control since they require two input sources (a) the input horsepower, and (b) the output. Measuring these values accurately and quickly for real time control can be a complex problem due to having to calculate the air horsepower directly based on the free stream properties of the air entering the device and leaving it for use by the carrier.

Accordingly, it has been determined that adjusting the power output of the prime mover 210 to variably control the air horsepower delivered to a carrier often provides improved control and stability. The power output from the prime mover to the fan can be adjusted by changing, for example, a gearing ratio. Changing the gearing ratio between the prime mover 210 and the fan, pump or compressor 220 changes the operating point of the fan, pump and/or motor, adjusting the amount of air horsepower generated. Alternatively, a motor control may be used to adjust the power output from the prime mover. For electric motors, this may be a variable frequency drive for an A/C type or a DC motor control of known types for motors using direct current.

Approaches that focus on adjusting the power output of the prime mover or the fan have been found to be easier to control and generally more stable. In this regard, calibration curves can be prepared and used in algorithms for the control system that correlate carrier speed, weight, condition, type, and other factors affecting carrier motion to the prime mover power input and output. Based on these factors and settings, slowed form control algorithms, or those based on additional inputs and fuzzy logic can be deployed to control carrier speed, acceleration and decelerations.

Figures 11, 12:
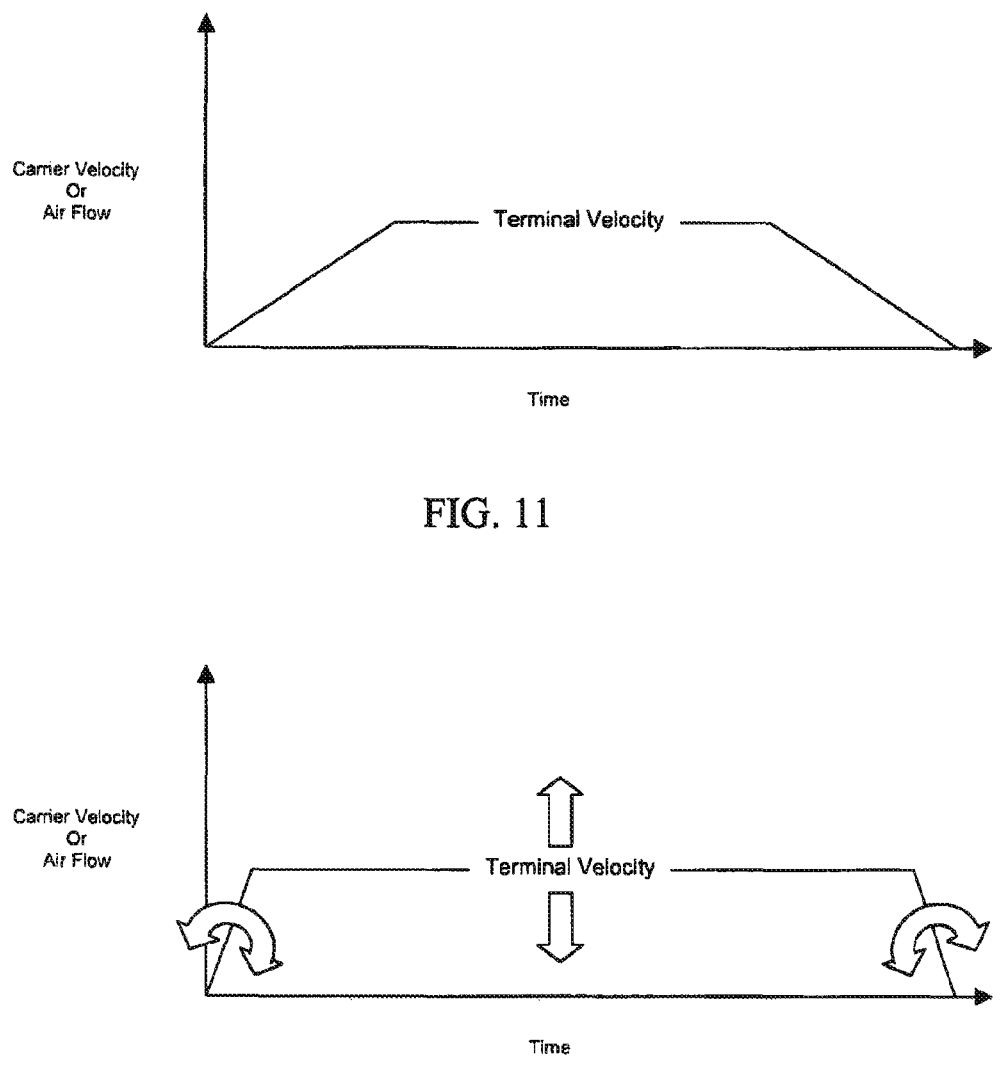

Under basic conditions, the prime mover can be controlled via the controller to have discrete responses to various types of transactions. For example, an empty carrier or a carrier with an insensitive payload may have a standard handling profile (See FIG. 11) with a constant acceleration and deceleration as well as a high average speed, while a sensitive payload could have a variable handling profile (see FIG. 12), which allows for establishing a slower acceleration, a slower average speed, and/or a slower deceleration. In this latter regard, the prime mover may ramp up and ramp down to reduce acceleration forces on the carrier.

Different types of payloads, as well as the appropriate handling profile, may be determined either discretely by the user, by interrogation of the carrier itself, for example through radio, optical, magnetic or other coupling means designed to transfer information about the carrier contents to the control system or by inference through adaptive control or so-called "fuzzy logic" inputs and algorithms.

Control algorithms may include deployment of adaptive methods to both optimize ride quality for the carrier as well as system throughput. For example, a system control could adapt the speed it moves carriers based on detection of elements of the path as well as its personality, for example by noting that some paths have more vertical travel than others of similar length. Decisions about when to begin deceleration profiles also can be discrete from sensor inputs or via adaptive algorithms. For example, the control system could sense the location of the carrier directly, as well as its speed from added sensors. Alternatively, existing sensors could be deployed for this purpose, and the system "trained" to begin decelerating carriers for a particular path or personality before it strikes the air column.

In an alternate arrangement, use of the variable speed drive may be implemented using compiled personality information. In this regard, the personality (e.g., roughness, length, bends, radius of bends, etc.) of each component or segment of a pneumatic system may be identified and/or stored to a database (e.g., archive 33 of FIG. 2). In one arrangement, a measurement carrier may be launched through the different components of the system in order to measure, for example, impacts, vibration (which may be a function of roughness), accelerations, decelerations, centripetal forces, etc. Further, it will be appreciated that many different components may be monitored at different transport speeds in order to generate functions or curves that associate personality of the component/segment of the pneumatic tube system to one or more variables including, without limitation, carrier velocity, carrier weight, etc.

Where personality data exists for the components/segments of a pneumatic tube system, a handling profile for transferring the carrier through the system may be generated upon determining a path through the system for the carrier. In this regard, the controller may access personality entries from the archive for each component of the system along the path through which the carrier will be routed. Accordingly, this information may be utilized to determine appropriate handling characteristics for one or more components of the system. For instance, if a sensitive payload is identified (e.g., via user input or carrier interrogation) and the carrier is to move a considerable distance through the system, the velocity of the carrier through each component of the system may be reduced to lower the aggregated energy imparted to the carrier and its contents. In contrast, a sensitive payload carrier moving a short distance through the system may be handled at a higher velocity as the aggregated energy imparted to the carrier and its contents may be lower.

Stated otherwise, the system may compare the expected forces applied to a carrier and its contents against a predetermined threshold. Accordingly, the system may adjust air flow velocities (e.g., via the prime mover) in order to maximize throughput of carriers through the system without exceeding what is considered an acceptable level of aggregate forces applied to the carrier and its contents.

For instance, as shown in FIG. 1, a carrier being launched from express station 16A to destination station 18A will pass through multiple components of the pneumatic system 10. Specifically, the carrier will experience launch forces at station 16A, acceleration/deceleration through the pneumatic tube connecting the express station 16A to traffic control unit 14, handling forces at TCU 14, acceleration/deceleration though a pneumatic tube while being transferred to multi-linear transfer unit 12, handling forces at MTU 12 and subsequent acceleration/deceleration through express lines 6. These handling forces will be repeated at the receiving MTU 12, subsequent TCUs 14, bypass transfer units 21, transfer units 20 and destination station 18A, as well as interconnecting pneumatic tubes. By accessing the database/archive having information for each of these components or path segments, a forcing function (e.g., an aggregate force) may be determined that correlates with the amount of force that may be expected to be applied to the carrier passing between the launching station 16A and destination 18A. Accordingly, it may be desirable to adjust one or all of the handling profiles of the different path segments through the system, such that the aggregate force applied to the carrier remains below a threshold value.

Figure 13:
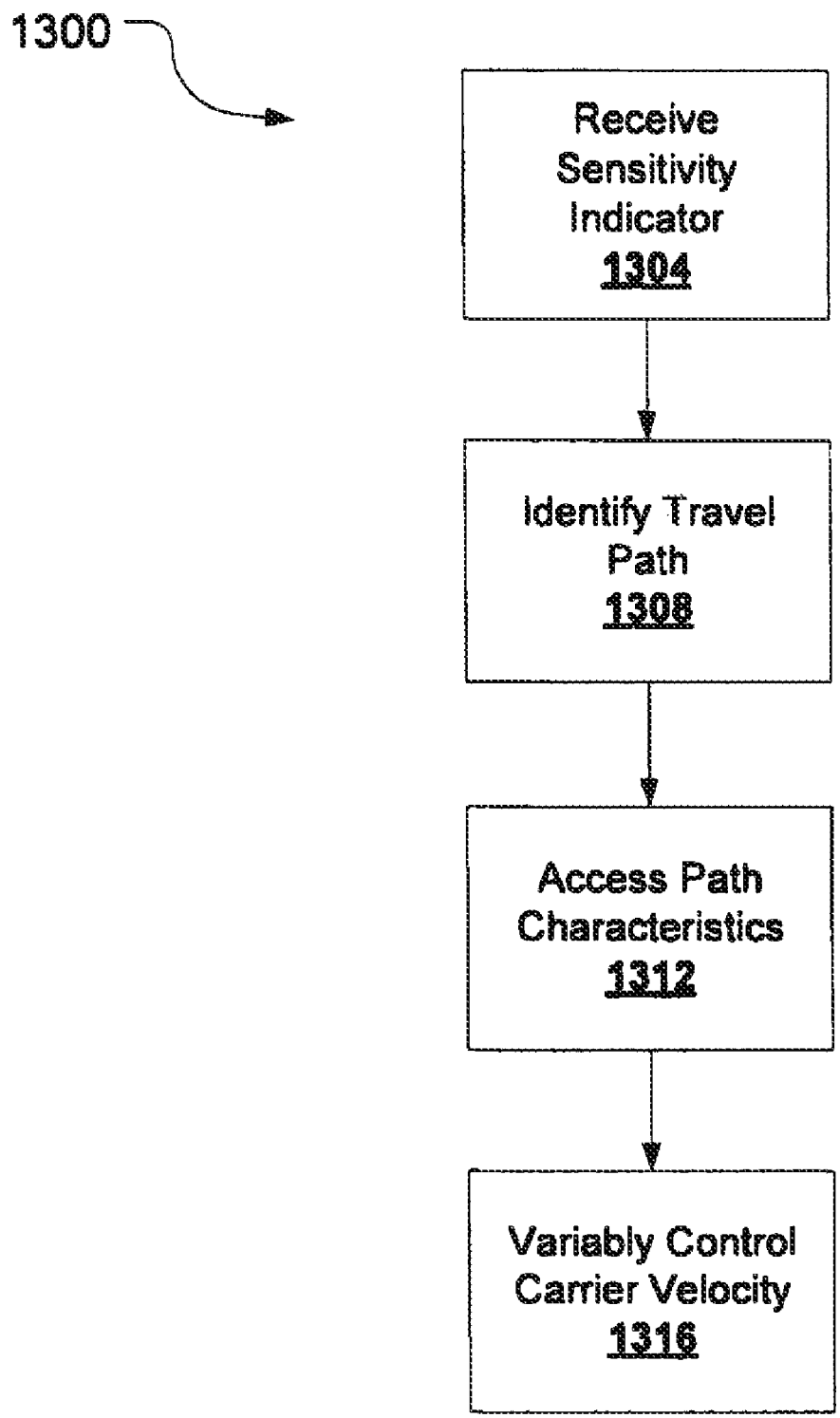
FIG. 13 illustrates a method for operating a pneumatic transport system that allows for reducing forces applied to a pneumatic carrier.

FIG. 13 illustrates a method 1300 for operating a pneumatic transport system that allows for reducing the forces applied to a payload. The system may receive 1304 a sensitivity indicator associated with a carrier travelling through the system. The sensitivity indicator may have any number of possible values, from a simple "YES/NO" indication to more nuanced ranges as described above. By way of example and not of limitation, receiving 1304 the sensitivity indicator may involve receiving information from a user interface, interrogating the carrier directly using electromagnetic or other means, or inferring a sensitivity level using "fuzzy logic" inputs and algorithms.

For each carrier to be transported, the system will identify 1308 a travel path between an origination location and a destination location. The step of identifying 1308 a travel path may occur either as a single operation or as an iterative process. For example, in a system having multiple possible routes between a given origin destination pair, it may be desirable to redirect a carrier along a lower-traffic or lower-impact route to achieve a balance between transit time and energy imparted to the carrier's payload. One method of identifying 1308 a travel path is shown in FIG. 14 and described below.

Once the travel path has been identified 1308, the system accesses 1312 previously stored characteristics of the selected path. As described above, these characteristics may include any information associated with forces that might be applied to a carrier travelling through individual segments of the pneumatic system on a given path. Optionally, accessing 1312 the path characteristics may include reading information from a table or database of values that have been derived from a pneumatic transport system characterization process. In any case, the path characteristics may then be used to variably control 1316 the carrier velocity to reduce forces applied to the carrier below a desired level. One method of variably controlling 1316 the carrier velocity is depicted in FIG. 14, which will now be described.

Figure 14:
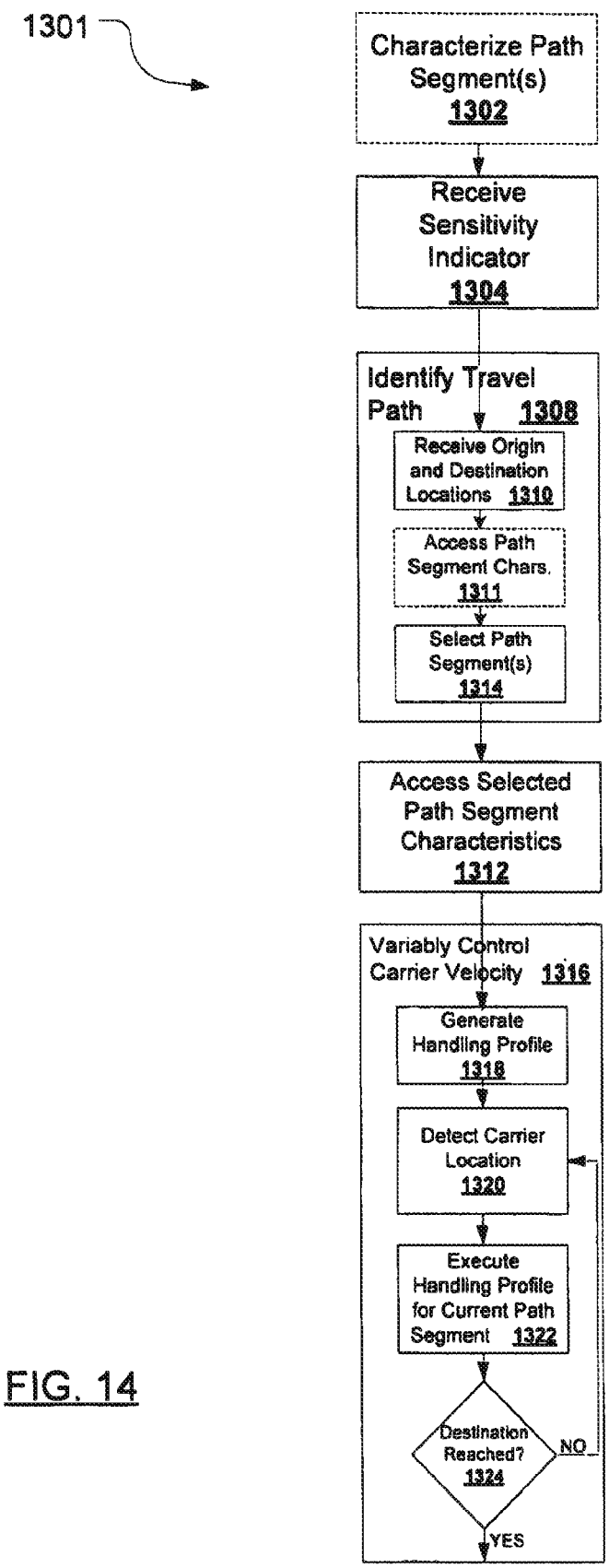
FIG. 14 illustrates a method for transporting a pneumatic carrier through a pneumatic tube system that allows for reducing forces applied to the pneumatic carrier.

A method 1301 for transporting a carrier through a pneumatic system that allows for reducing forces applied to the carrier and its payload is illustrated in FIG. 14. Initially, one or more path segments in a pneumatic transport system are characterized 1302. In one embodiment, each path segment in the pneumatic system is characterized during a process that measures forces applied to a carrier and/or its payload as the carrier passes through system at various speeds. This information may be stored and/or used to develop algorithms or characterization equations representing each path segment. The characterization process may be performed only once or may be repeated as the pneumatic transport system is maintained and upgraded.

As a carrier begins a transaction in the transport system, a corresponding sensitivity indicator is received 1304 as described above with respect to FIG. 13. The process of identifying 1308 a travel path begins with receiving 1310 an origination location and a destination location. The origination location may be obtained automatically as the carrier enters a transfer tube, or by any appropriate means. Similarly, the destination location may be received from a user interface, read from information encoded in the carrier, or by any other suitable means. Other information may also be received, such as a priority level or other routing information.

Optionally, when more than one possible travel path exists between the origination location and the destination location, it may be desirable to access 1311 path segment characteristics to aid determination of a desired path for the carrier to follow. Additionally or alternatively, an algorithm for selecting 1314 a travel path through the transport system may weigh factors such as transit time, priority level, and/or system traffic. In any case, the system selects 1314 a set of path segments between the origination location and the destination location.

Once a path has been identified 1308, the system accesses 1312 the characteristics of the selected path segments and uses this information to provide variable control 1316 of the carrier velocity as it moves through the system. Based at least in part on the path segment characteristics and carrier sensitivity indicator, a handling profile is generated 1318 for each path segment. A handling profile may include, for example, an initial acceleration/deceleration rate, a steady-state transit velocity, and/or a final acceleration/deceleration rate. The handling profiles of two adjacent path segments may be aligned to avoid abrupt changes in velocity as a carrier passes from one segment to another.

While the carrier moves through the pneumatic system, its location is detected 1320 by any appropriate means, including but not limited to radio, optical, magnetic, or other coupling means designed to identify the location of an object in a system. As the carrier enters each new path segment, the handling profile previously generated 1318 for that carrier and path segment is executed 1322. Specifically, the system may control the prime mover (or prime movers associated with different portions of the system) by varying the amount of output power in proportion to a desired carrier velocity or acceleration as specified by the handling profile for the current path segment. After each handling profile segment is executed 1322, the system may determine 1324 whether the carrier has reached its destination; if not, the carrier's current location may be determined 1320 and the next handling profile segment may be executed 1322.

The foregoing description of the system has been presented for purposes of illustration and description. Furthermore, the description is not intended to limit the invention to the form disclosed herein. Consequently, variations and modifications commensurate with the above teachings, and skill and knowledge of the relevant art, are within the scope of the invention. The embodiments described hereinabove are further intended to explain best modes known of practicing the invention and to enable others skilled in the art to utilize the invention in such or other embodiments and with various modifications required by the particular application(s) or use(s) of the invention. It is intended that the appended claims be construed to include alternative embodiments to the extent permitted by the prior art.

What is claimed:

1. A method for use in a computerized controller for operating a pneumatic carrier system where the pneumatic carrier system includes a plurality of user stations, pneumatic tubes and transfer devices, comprising the steps of:
   receiving, at said controller, an input requesting special handling for a pneumatic carrier;
   identifying a travel path for the pneumatic carrier through a pneumatic carrier system between an origination location and a destination location;
   accessing electronically stored path characteristic information for said travel path, said path characteristic information including at least smoothness information corresponding to at least one of expected carrier vibration over said travel path and expected carrier centripetal acceleration over said travel path; and based on said path characteristic information and said smoothness information for said travel path, generating an output control signal for variably controlling a power output of a power source connected to a pneumatic device that provides airflow to said pneumatic carrier system, wherein variably controlling the power output variably controls the velocity of said pneumatic carrier as it moves through said travel path between said origination location and said destination location.

2. The method of claim 1, wherein said travel path comprises first segment and second segment, wherein said first and second segments have first and second path characteristic information, respectively.

3. The method of claim 2, further comprising:
controlling said power output at a first power output level for said first segment; and
controlling said power output at a second power output level for said second segment, wherein said first and second power output levels are different.

4. The method of claim 3, wherein at least one of said first and second power outputs is a variable power output while said pneumatic carrier passes through the path segment corresponding with the power output.

5. The method of claim 1, wherein said path characteristic information identifies forces expected to be applied to the pneumatic carrier while passing through said travel path.

6. The method of claim 5, wherein said path characteristic information identifies forces expected to be applied to a pneumatic carrier as a function of a velocity of said carrier.

7. The method of claim 6, further comprising:
variably controlling the power output of said power source to reduce transit time of said pneumatic carrier over said travel path without exceeding a predetermined total force expected to be applied to said pneumatic carrier.

8. The method of claim 1, wherein variably controlling the power output selectively alters airflow velocity based on a location of said carrier in said travel path.

9. The method of claim 8, further comprising:
receiving location information for said carrier from at least a first communications device as said carrier moves through said travel path; and
based on said location information altering said power output.

10. The method of claim 1, wherein receiving said special handling input further comprises receiving an input identifying a specified type of contents and selecting a travel velocity for said type of contents, wherein said power output is controlled to establish said travel velocity.

11. The method of claim 1, wherein receiving said special handling input further comprises receiving an input identifying a specified type of contents and selecting acceleration and deceleration profiles for said type of contents, wherein said power output is variably controlled to establish said acceleration and deceleration profiles.

12. The method of claim 1, further comprising:
receiving at said controller at least one of a location input and a velocity input from one or more sensors within the pneumatic system while said pneumatic carrier is moving through said travel path; and
using said at least one input to adaptively control said power output of said, power source.

13. A method for use in a computerized controller for operating a pneumatic carrier system where the pneumatic carrier system includes a plurality of user stations, pneumatic tubes and transfer devices, comprising the steps of:
identifying a travel path through said pneumatic carrier system between an origination location and a destination location;
accessing electronically stored path characteristic information for said travel path, said path characteristic information including at least smoothness information corresponding to at least one of expected carrier vibration over said travel path and expected carrier centripetal acceleration over said travel path;
based on said path characteristic information, generating a handling profile signal for use in controlling airflow within said pneumatic tube system as a carrier moves through said travel path; and
outputting said handling profile signal to a power source connected to a pneumatic compression device that provides said airflow to said pneumatic tube system, wherein said handling profile signal varies the power output of said power source.

14. The method of claim 13, wherein said travel path comprises a plurality of path segments.

15. The method of claim 14, wherein generating said handling profile signal further comprises:
accessing electronically stored characteristic information for each of said path segments of said travel path;
determining, based on said characteristic information, a velocity profile for said carrier for each of said path segments.

* * * * *